US007116406B1

(12) United States Patent
Puttkammer

(10) Patent No.: US 7,116,406 B1
(45) Date of Patent: Oct. 3, 2006

(54) SECURITY ELEMENT STRUCTURE FOR DOCUMENTS, DEVICES FOR CHECKING DOCUMENTS WITH SUCH SECURITY ELEMENTS, METHOD FOR THE USE THEREOF

(75) Inventor: Frank Puttkammer, Coswig (DE)

(73) Assignee: WHD elektronische Prueftechnik GmbH, Dresden (DE)

( * ) Notice: Subject to any disclaimer, the term of this patent is extended or adjusted under 35 U.S.C. 154(b) by 0 days.

(21) Appl. No.: 09/423,275

(22) PCT Filed: Apr. 24, 1998

(86) PCT No.: PCT/DE98/01179

§ 371 (c)(1),
(2), (4) Date: Jan. 27, 2000

(87) PCT Pub. No.: WO98/49657

PCT Pub. Date: Nov. 5, 1998

(30) Foreign Application Priority Data

Apr. 25, 1997 (DE) ........................................ 197 18 916
Mar. 16, 1998 (DE) ........................................ 198 12 812

(51) Int. Cl.
*G06K 9/74* (2006.01)
*G06F 17/00* (2006.01)

(52) U.S. Cl. ........................................ 356/71; 235/375

(58) Field of Classification Search .................. 356/71; 235/375, 441

See application file for complete search history.

(56) References Cited

U.S. PATENT DOCUMENTS 5,471,039 A * 11/1995 Irwin, Jr. et al. ........... 235/441
5,621,200 A * 4/1997 Irwin, Jr. et al. ........... 235/375

* cited by examiner

*Primary Examiner*—Michael P. Stafira
*Assistant Examiner*—Roy M. Punnoose
(74) *Attorney, Agent, or Firm*—Karl Hormann

(57) ABSTRACT

This invention relates to the structure of safety elements for documents and devices for the testing of test documents including said safety elements as well as procedures of application according to patent application DE 197 18 916.4. It is the object of this invention to complete the structure of safety elements by additional safety elements and to contemplate devices for the testing of said safety elements as well as a new application procedure of safety elements and devices which will make it very difficult, if not even impossible, for the counterfeiter to draw any conclusions from the functioning of the test procdures and devices to the safety elements to be tested and, thus, to produce counterfeits that are so similar to the originals that they are not detected by the test devices. The structure of the safety elements for documents to be tested provides a new design not primarily based on a visual examination but on test procedures. This design—hereinafter called functional design—is the combination of electrically conductive and isolating structures having the same or a different size, at the same or different levels to each other, with the same or different conductivities, and it is made of metallized structures and/or conductive inks or printing inks.

8 Claims, 3 Drawing Sheets

Figure 1:
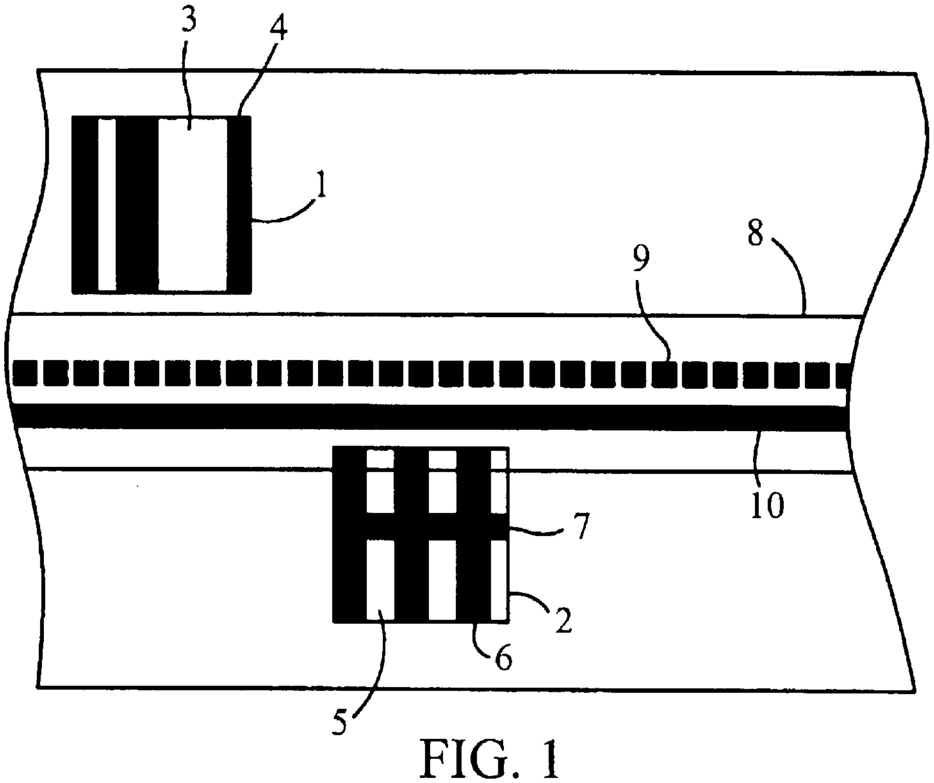

SECURITY ELEMENT STRUCTURE FOR DOCUMENTS, DEVICES FOR CHECKING DOCUMENTS WITH SUCH SECURITY ELEMENTS, METHOD FOR THE USE THEREOF

This invention relates to the structure of safety elements for documents and devices for the testing of documents with said elements as well as procedures of application according to patent application DE 197 18 916.4.

Until now documents including diffraction-optically effective safety elements used to be checked by costly optical test procedures. For instance, a test of documents with diffraction-optically effective safety elements or so-called OVDs (optical variable device) is impossible within a document handling machine since it runs at very high speeds. DE 27 47 156 specifies a procedure and a test instrument for the counterfeit test of holographically secured identity cards. The OVD is reproduced and then visually checked. This procedure is not suitable for a fast, efficient, person-independent test. In EP 0 042 946 a device for the production of scanning patterns that are tested by means of laser, mirror and line systems as well as a photo detector is specified. The economic expenses are also very high in this case. It would even be higher if the material to be tested shall be tested unsortedly. In order to avoid a presorting process a multiple arrangement of counterfeit test systems or a repeated test would be necessary.

In EP 0 092 691 A1 a device for the detection of security strips in bank notes is specified. By means of two transmitted-light measuring channels in the infrared range and at wave lengths of about 5 μm the material-specific absorption bands of a plastic safety strip are measured. A counterfeit or quality test of diffraction-optically effective safety elements that reflect metallically, such as reflex holograms or kinegrams, is not specified in said EP and would not be possible by said device. From GB 21 60 644 A it is known that a reflected-light procedure of bank notes is tested by means of a line scan camera, and from CH-PS 652 355 it is known that cards with a special layer structure are tested by means of a reflected-light procedure or transmitted-light procedure. In both cases it is a test in which received image information is compared with the originals. The reflections and traces of use appearing on both versions are a problem and a big disadvantage. An automatic counterfeit test of hologam information is specified in DE-OS 38 11 905. For the reflected-light hologram test the arrangement specified in the DE-OS provides that the transmitter and the receiver shall be arranged directly opposite to each other in order to be able to analyse the hologram information. This opposite arrangement of the transmitter and the receiver results in a metrologically disadvantageous overriding and sometimes even in a damage of the receiving elements by a direct light incidence in the interspaces between the successive bank notes. When testing used bank notes existing creases make a test practically impossible because of accidental reflections.

According to the known procedures specified above an exact positioning of the objects to be tested is required, and all devices are not suitable for high-speed handling machines.

In DE 196 04 856 A1 it is contemplated to carry out the condition, quality and register test of optical safety features in the form of metallically reflecting layers such as kinegrams, holograms and the like, on security papers, especially bank notes, in such a way that a metallically reflecting safety feature of the security paper is scanned by transmitted light in an actually known way by means of at least one electronic camera, preferrably a CCD line scan camera, and that the actual values determined in this way are compared with the desired values by means of image evaluation methods actually known in order to mark bank notes having faulty safety features or to seperate used notes into a sorting unit. The device specified in DE 196 04 856 A1 is characterized by a transport system actually known to transport security papers within the range of the electronic camera, by an infrared radiation source on that side of the security paper to be tested which is opposite to the camera and that the optical axis of the camera includes an angle deviating from 180° with the optical axis of the illumination unit, and that the transport unit is preferrably set up by transport belts that are spaced to each other transversely to the transport direction.

This device or procedure has a disadvantage as well, such that especially used bank notes with creases or bank notes with a damaged kinegram film or a kinegram film the surface of which is contaminated are not detected as real bank notes. In addition, the specified procedure and the device relating to it are automated, however, they are not suitable for the high-speed bank note machines in circulation having a pass of $\geqq$1,200 notes per minute.

Diffraction-optically effective safety features or OVDs on security papers, such as the German 100 and 200 DM notes, are, at the moment, manually or visually tested concerning damages, register accuracy, exact edge formation etc. The test is carried out visually during the bank note manufacture and, if necessary, during the sorting out of bank notes returning from circulation. This procedure is time-consuming and costly. In DE 195 42 995 A1, inter alia, a procedure for the counterfeit test of a data carrier by adjusting the various data available is specified.

According to this patent specification there are the following possibilities:

- comparison of the standard image of the hologram with the one of the memory unit,
- comparison of the hologram data of the hologram with the data within a defined
- range of the data carrier and/or those of a memory unit,
- comparison of the hologram data with the data available via an input unit,
- comparison of the individual image of the hologram with the data of the input unit of the memory unit and/or the data of the defined range.

This procedure is also time-consuming and costly. The testing is carried out optically by balancing via image detection by a reading device, and it is not suitable for high-speed handling or testing machines.

In addition, inks are known as a test feature including special physical features to secure security documents and bank notes. It is possible to distinguish between inks that can be seen or felt visually without any aids and those that can only be detected by special aids depending on the respective physical property of the ink, such as electric conductivity or fluorescence.

Interference inks belong to the group of inks that can be detected without any additional aid. They can be found among the DM bank notes of the series from 1996 on (1997 issue). When changing the examination angle a colour change can be observed. By this tilt effect a fast and uncomplicated manual single note test of bank notes is possible. Inks with flourescent or magnetic features or with a certain electric conductivity can only be detected by proper aids. Previous test devices, however, have a relatively low resolution and the corresponding safety features must have large dimensions in order to guarantee a good detectability.

When testing printing inks with different conductivities it proved to be a disadvantage that the different conductivities must be tested by different test devices in the same test process successively or in two test processes by the same test device given a proper software design. In addition, the measuring accuracy is low if the conductivity of the test field is low. It is not possible to test electrically conductive printing inks with a different electric conductivity due to their coating thickness and feature substrates by means of well-known test devices because of their low resolution-capacity.

The well-known features, test zones and test structures to be tested as well as the test procedures and devices for the counterfeit test of objects, security papers, especially bank notes, have a major disadvantage which is their degree of being known. This degree of being known makes it possible for the counterfeiter to draw conclusions from the knowledge of the test procedures and devices and the way they work to the features, test zones and test structures to be tested. This requires a completely new formulation for the testing of objects, security papers, especially bank notes, the solution of which must be reflected in a new application system of test features, test procedures and test devices in order to avoid that information codes may be easily discovered and copied.

It is the object of this invention to overcome the disadvantages of the state-of-the-art and to complete the structure of safety elements for documents by additional safety elements, and to contemplate devices for the testing of such safety elements as well as a new procedure of the application of safety elements and devices that make it difficult, if not even impossssible, for the counterfeiter to draw conclusions from the functioning of the test procedures and devices to the safety elements to be tested in order to produce counterfeits that are so similar to the originals that they are not detected by the test devices.

In addition, it is the object of this invention to contemplate diffraction-optically effective safety elements and features or OVDs, respectively, that have to be precisely tested in combination with electrically conductive printing inks quickly, person-independent and at low costs. The devices for the feature test belonging to it shall be used in high-speed document handling machines as well as in manual test devices. In addition, it is the object of this invention to design some of the devices relating to this invention such that they test a defined number of various safety elements or features existing on a document where the number of the safety elements to be tested varies between the devices. This object is directed to reaching different test criteria according to the potential expenses and testable safety elements.

This object is solved by the following invention specification.

The structure of safety elements for documents to be tested provides a new design not primarily based on a visual examination but on test procedures. This design—hereinafter called functional design—is the combination of electrically conductive and isolating structures having the same or a different size, at the same or different levels to each other, with the same or different conductivities, and it is made of metallized structures and/or conductive inks or printing inks. In its variety and composition the functional design gets coding functions in all distinguishable safety elements and is, thus, testable in a coded way. According to this invention the functional design can be a diffraction-optically effective safety element or it can consist of electrically conductive colours or. inks. If it is designed as a diffraction-optically safety element it can concur with the optically, hence visually perceptible design and it can even support it in its optical design. Furthermore, it is possible to sputter the demetallized or non-metallized zones in order to upgrade the brilliance.

Today, holograms and other diffraction-optically effective safety elements for the securing of certificates and other security papers as well as bank notes for the prevention of counterfeits are used more and more. Such documents are for instance DM bank notes of the 1996 series with a diffraction-optically effective safety element in the form of a kinegram in addition to the electrically conductive safety strip.

Electrically conductive printing inks are also well-known. These inks are included in the different printing images, especially on bank notes, in structures of one test feature, and they don't allow any distinguishing or detection of the structures due to their low resolution. This increases the forgery-proof quality of the documents. For instance, the bank note numbering or other graphic details may consist of these inks. Structures according to this invention in test zones or printing images of electrically conductive inks have, in addition to more or less fully-printed print areas actually known, at least one testable beam-shaped, latticed, curved and/or circular safety element with a line width of $\leqq 5$ mm. At the same time these safety elements constitute a coding of information detected and evaluated by devices according to this invention. In order to extend the specified coding and to increase the test safety electrically conductive inks with different conductivities and tints are used according to this invention which are, for instance, applied in different ink thicknesses in order to get different codings from the different conductivities in this way. The inks with their different conductivities—as specified by different inks/ or different ink thicknesses—serve the coding and increase the forgery-proof quality. In addition, the codings resulting from the different conductivities of the inks are combined as another safety standard with diffraction-optically effective safety elements. Using the capacitive coupling the electric conductivity of discontinuous metallizing layers or partially metallic layers or zones of metallic layers at different levels is evaluated for the counterfeit test of documents with diffraction-optically effective safety layers.

The received signals of this evaluation are linked with the coding signals of the ink evaluation and sent as a uniform test signal of the electronic evalution unit.

The device for testing the specified test features according to this invention has a capacitively working scanner. This scanner consists of a number of adjacent transmitting electrodes and a receiving electrode located in parallel to this arrangement. Compared with sensors with large-surface electrodes this scanner with small electrode surfaces has the advantage that there is a lower capacitive coupling between the individual electrodes. In a document handling machine the scanner is arranged such that the optical or mechanical sensors existing in the conventional document handling machines activate the test device according to this invention. In order to reduce detection and measuring errors a sensor carrier is preferrably used which takes up all sensors for testing. The distances between the sensors are minimized. This minimization of the distances between the sensors is required for a minimization of the change of the position of the objects to be tested, such as bank notes, since the position of the bank note changes during the bank note pass through the machine due to the bank note condition, the wear of the machine as well as the ambience conditions, especially temperature and air humidity. By an unfavourable bank note feed the bank note distance to each other changes. A skew bank note pass can also result from the wear of the transport rollers and bearings, that also means that a bank note just fed may twist during the transport. It is the result of this undesired change of position that the defined timing is disturbed and false rejects occur. The smaller the test zones are the more problematic is their detection. Due to the low differences in conductivity between the isolating carrier and, for instance, the electrically conductive inks the device according to this invention has a pressure device. This pressure device is required because the distance between the transmitting and the receiving electrode is very small and, hence, the probability that an even test zone of the bank note would touch the sensor is low. However, the pressure device must be a very low resistance for the bank note. Preferrably, a pressure device is made of a film which is segment-wise regularly divided into segments. As an alternative, brushes are suitable for this considering that the resistance for the bank note is low since highly creased bank notes are also accepted. This pressure device transports the document parallel to the scanner or preferrably presses the document to be tested onto the scanner.

Furthermore, the axes of the transport rollers are grounded by means of sliding-action contacts. By these additional shieldings and the pressure device repetitive test conditions for an even bank note distance or contact are guaranteed and the mode of operation of the sensor is improved essentially. The control of the individual transmitting electrodes by electric energy is made on a time-shifted basis by means of an electronic control system with a switching rate in the kHz range and higher. The electronic control system includes as major parts, in addition to the power supply, a multiplexer, an oscillator for the supply of energy for the transmitting electrodes and an oscillator for the control of the multiplexer.

The energy of the controlled transmitting electrode is capacitively overcoupled in case of electric conductivity between this transmitting electrode and the receiving electrode. The signal path on the receiving electrode is transformed into a signal image. The signal image depends on the structure of the electrically conductive layer of the safety element. An electronic evaluation system downstream the receiving electrode compares the signal image of the tested object with the corresponding reference signals. Basically, the electronic evaluation system consist of a power supply, an amplifier, a demodulator, a comparator, a microprocessor with memory as well as filters for the suppression of interference and unwanted signals.

In addition to the software for the microprocessor, reference signal images are stored in the memory which are compared with the scanned signal image of the test document depending on the features to be tested. Since the scanner extends over the full width of the document each electrically conductive feature is detected by the device according to this invention. The comparison with the reference signal images provides a classifying signal for further processing. Accordingly, a document detected as a counterfeit could be sorted out by stopping the test equipment or bypassing the bank note transport path. In order to reduce unwanted effects the sensor carrier is compactly connected with a board that carries the electronic control and evaluation system.

The entire test device is mounted inside the document handling machines so that the space required for it can be kept relatively low. The transmitting and receiving electrodes are arranged below or above the documents in document handling machines such that a safe scanning is guaranteed. This can be done, for instance, by means of belts or in the area of the guiding units so that the document is pressed onto the transmitting and receiving electrodes during the transport. For ink prints with low conductivity differences feed rollers or the pressure device specified above are used the axes of which are grounded additionally.

As a modification of the electrode arrangement it is within the scope of this invention to arrange a long transmitting electrode parallel to a side-by-side mounting of a number of parallel receiving electrodes. In this case the received signals are processed by means of a multiplexer. The rest of the electronic evaluation system corresponds to the one specified before.

Another design of the transmitting and receiving electrodes is characterized by the fact that a number of transmitting and receiving electrodes are arranged in parallel and/or in series. The control as well as the reception of the signals are processed according to the multiplex or demultiplex procedure.

For the use in manual devices they are analogly equipped with the corresponding devices for the transport of the document or the scanner, the function of which is similar to the transport devices in copiers, automatically-fed optical image scanners or facsimile units.

As a modification of this, a device is provided that defines the position of the capacitively working scanner of the test device according to this invention relative to the document by means of stopper elements.

For a determined test of a defined number of safety features of a document the device has a different number of parallel transmitting and receiving electrodes. The higher the resolution received in this way is the more safety elements and codings can be tested that are much more difficult to be counterfeited. In this way, simple manual devices, for instance for daily use where the presence of safety features, such as a simple safety thread, is tested may be manufactured simply, at low costs and for easy handling. Devices having a higher resolution allow the testing of additional safety features, however, without being able to detect the safety features. This is realised by a simple microprocessor software which is only sensitive to certain safety features and which is not public. A higher resolution with the propperly designed software for the microcontroller makes it possible to test all safety features. This costly test is for instance applied by the manufacturers of said safety features and by users who have a very high safety standard in order to get best possible test results. In this way different conductivities can also be detected reliably.

In addition to the entire system of using the specified features and devices for the test of objects, documents, especially bank notes, the carrying out of an image detection and a condition control of the bank notes is also provided accoding to this invention. By means of the electrically conductive test features an image detection is also possible by coding, that is an independent coding or a coding supporting as an aid for sorting purposes, a coding for the determination of denominations and a coding for the counterfeit determination. For an independent coding there is no other test feature and the electrically conductive feature must be clearly identifyable, such as the position on the bank note, in order to minimize the false reject rate. For a coding supporting as an aid there are other features; the coding serves as a reference means for the case that a false reject was detected. A condition control is carried out by means of the test device according to this invention such that the conductivity of a test feature allows to draw conclusions to the condition of the bank note because a highly worn bank note results in a wear of the electrically conductive printing inks as experience shows and, hence, the electric conductivity changes. The various wear rates are classified by the software.

Hence, defined bank notes with a certain wear rate can be sorted out. This wear rate is for instance shown by a partially damaged OVD, a torn bank note and a safety feature damaged by this or a highly creased bank note where there was a break within the safety feature. Hence, there are varied combination possibilities between counterfeit test, image detection and condition control. Besides the optical design of test zones on an object to be tested the safety structures according to this invention get codings—as specified in detail above—which are summed up to a main code in a mathematical reference to each other—for instance as a summation—which in turn determines the authenticity, condition or the currency of a certain bank note by means of a signal or code from the synchronous counterfeit test of a metallic safety thread and/or a synchronous test of an OVD.

The features of this invention appear, in addition to the claims, from the specification and the drawings where the individual features, individually or many together in the form of subcombinations, represent advantageous, protectable designs for which we seek protection. Design examples of the invention are shown in the drawings and will be exlained as follows.

Figure 2:
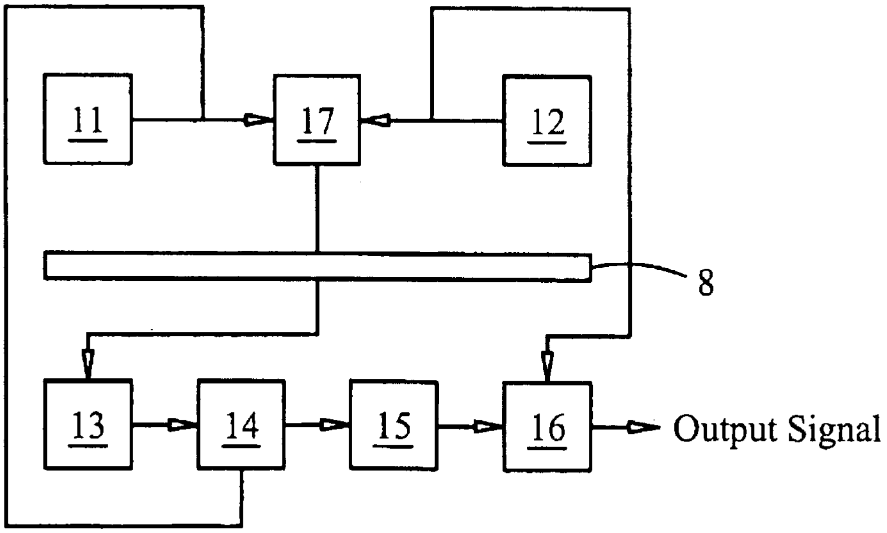
Figure 4:
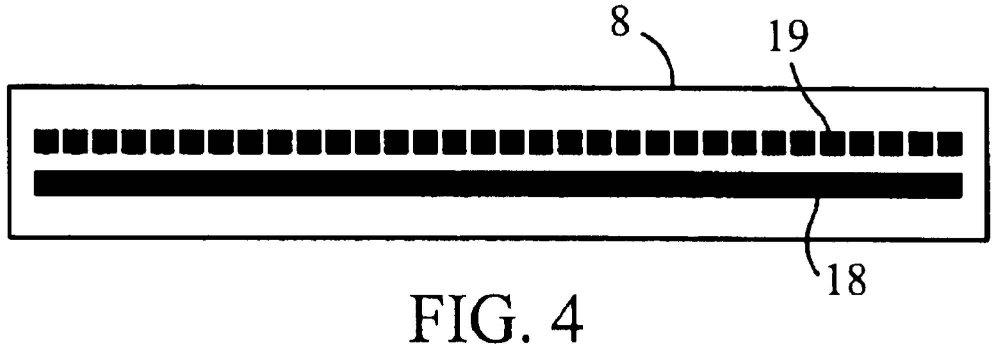
Figure 5:
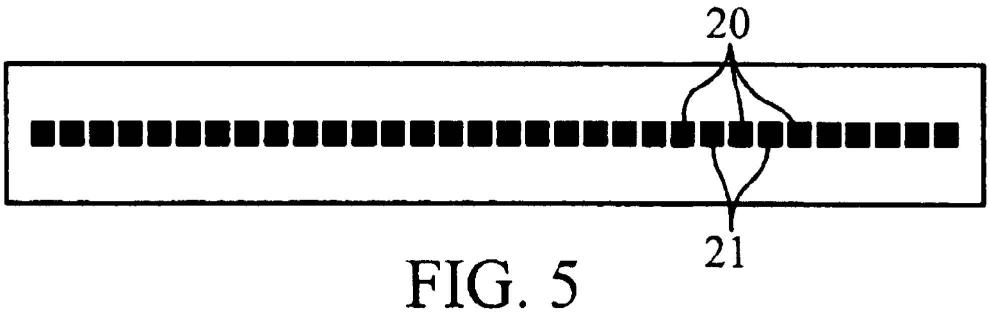
Figure 6:
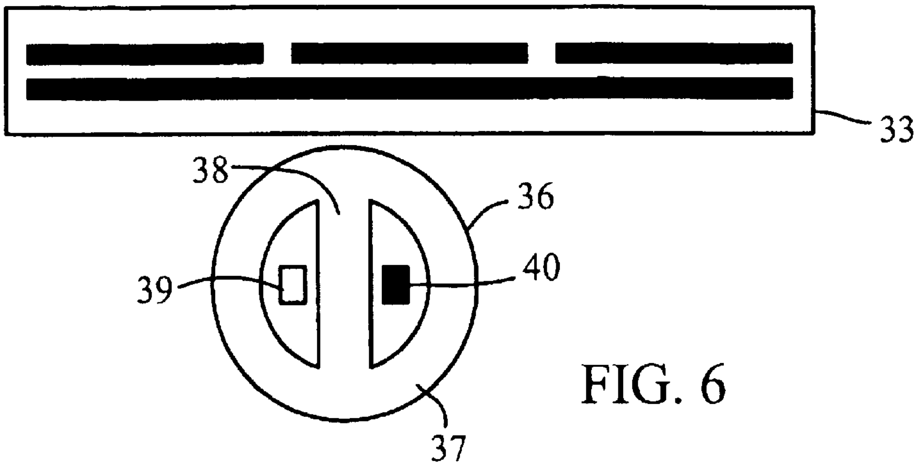
Figure 7:
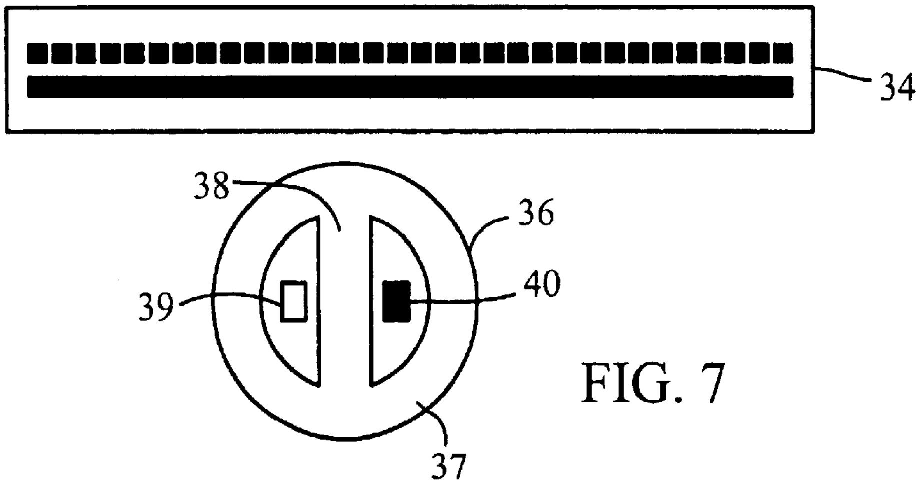
Figure 8:
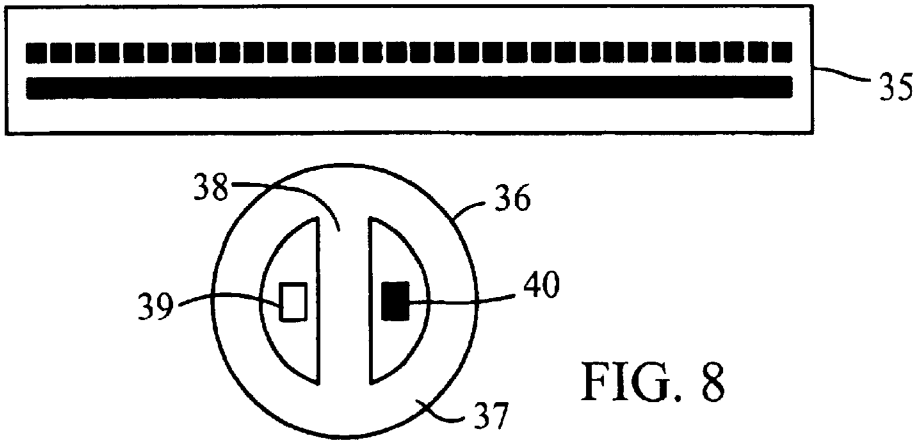

In the drawings:

FIG. 1 illustrates a schematic view of a document with electrically conductive ink print and OVD, FIG. 2 illustrates a block diagram of a test device, FIGS. 3–6 illustrate a schematic view of various scanners, FIGS. 6–8 illustrates a schematic view of scanners and a structured safety feature.

FIG. 1 illustrates a document with an electrically conductive ink print 1 and one OVD 2. The specific combination of different safety elements results in an additional coding. This increases the test safety. This fig. illustrates the schematic set-up of an electrically conductive ink print I where alternatingly conductive strip-shaped zones 3 and isolating strip-shaped zones 4 are arranged in parallel. The zones 3, 4 strip-shaped in top view run parallel to the document transport direction. The OVD 2 consists of a metal layer 5, strip-shape dematallize zones 6 running parallel to the document transport direction as well as demetallized zone 7 running vertically to the document transport direction.

Furthermore, FIG. 1 illustrates the schematic view of the scanners 8 with a number of transmitting electrodes 9 and one receiving electrode 10.

FIG. 2 illustrates the block diagram of the test device according to this-invention, consisting of one electronic control system, one capacitively working scanner 8 and one electronic evaluation system. The electronic control system includes mainly, in addition to the power supply, one demultiplexer 17, one oscillator 11 for the supply of energy for the transmitting electrodes and one oscillator 12 for the control of the demultiplexer.

The electronic evaluation system consists mainly of one power supply, one amplifier 13, one demodulator 14, one comparator 15, one microprocessor 16 with filter as well as filters for the suppression of interference and unwanted signals.

The transmitting and receiving electrodes are casted in a sensor carrier. They form a capacitively working scanner over the entire document front-feed width 8. The strip-shaped receiving electrode runs transversely to the document front-feed direction. The transmitting electrodes run parallel to the receiving electrode. The distiance between a transmitting electrode and the receiving electrode is determined by the document-typical electrically conductuve test features. By a side-by-side arrangement of several transmitting electrodes there is the possibility to detect several electrically conductive features in the longitudinal axis of the capacitively working scanner 8 at the same time. The resolution reached by this arrangement depends on the number of the transmitting electrodes used. In this design example the resolution is at a scannable point per mm in lengthwise as well as transverse direction. The minimum distance between adjacent transmitting electrodes is limited by the interfering capacitive coupling among themselves. In order to avoid this and in order to reduce interfering influences of adjacent transmitting electrodes the transmitting electrodes are controlled by a multiplexer 17 one after another. By the arrangement of the transmitting electrodes over the entire document front-feed width the documents are tested in any position. That means it is not necessary to presort various documents in a document handling machine.

Figure 3:
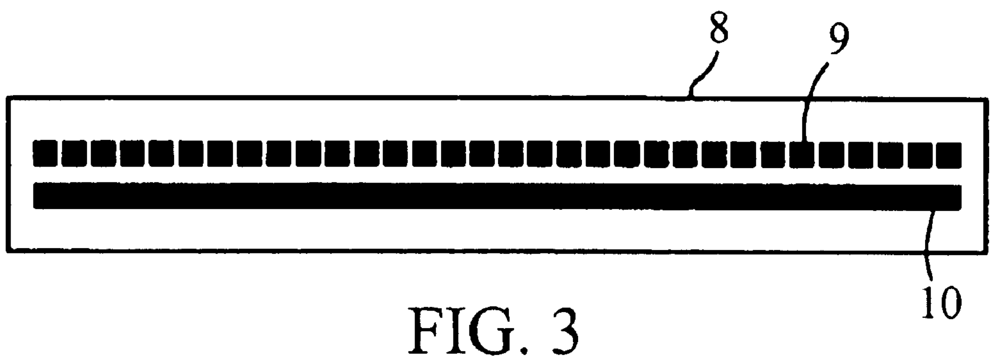

FIG. 3 illustrates the schematic view of the scanner 8 with a number of transmitting electrodes 9 and one receiving electrode 10. The control and evaluation is carried out according to the block diagram shown in FIG. 2.

FIG. 4 illustrates the schematic view of a design of the capacitively working scanner with a transmitting electrode 18 and a number of receiving electrodes 19. As a modification of the block diagram according to FIG. 2 the transmitting electrode 18 is controlled by means of the oscillator. The signals of the receiving electrodes 19 are processed by means of the multiplexer. The other part of electric evaluation system consisting of a power supply, an amplifier, a demodulator, a comparator, a microprocessor with memory as well as filters for the suppression of interference and unwanted signals is similar to the one in the block diagram according to FIG. 2.

FIG. 5 illustrates the schematic view of another design of the capacitively working scanner with a number of transmitting electrodes 20 and a number of receiving electrodes 21. They are alternatingly arranged in one line. Accordingly, the control signals of the transmitting electrodes 20 as well as the evaluation signals of the receiving electrodes 21 are processed by means of multiplex and demultiplex processes.

FIGS. 6 to 8 illustrate the schematic view of scanners 33, 34, 35 and a structured safety feature 36. The structure of the safety feature 36 consists of a ring-shaped safety element 37, a strip-shaped safety element 38 and two rectangular safety elements 39,40. The safety elements 37, 38, 39 consist of electrically conductive ink while safety element 40 is optically similar to safety element 39 but has, however, no electric conductivity. This increases the test safety since it is visually not perceptible which safety features are on a document. Simple manual devices include a scanner 33 according to FIG. 6. The resolution is so low that only the strip-shaped safety element 38 can be detected. Such manual devices are good for daily use because they can be manufactured simply, at low costs and for easy handling.

Devices with a higher resolution according to FIG. 7 consist of a scanner 34 and allow, besides the testing of a strip-shaped safety element 38, the testing of additional safety elements, in this case a ring-shaped safety element 37. The rectangular safety elements 39, 40 are not tested. This is realised by a simple microprocessor software which is only sensitive to certain safety elements. The rectangular safety elements 39, 40 are not available in the memory as reference signals.

A higher resolution with a properly designed software for the microcontroller is illustrated in FIG. 8. It allows the testing of all safety features, that is, also the rectangular safety elements 39, 40.

In order to meet the object specified in this invention to contemplate a new system of the application of test features, test procedures and devices in order to avoid that the functioning of test procedures and devices is known or becomes quickly known the following use of test features, test zones and structures using a corresponding procedure application and including the devices according to this invention is explained.

The following examples shall illustrate the application of this invention. For a large application of this invention it is necesary to fix groups of testing persons who will purposefully get a certain knowledge about a test system and who will carry out the counterfeit test and also the image detection and a condition test by means of the specified test method.

By means of groups A, B and C the application of this test system shall be explained.

Group A

It is well-known that the state bank provides publications on active safety features so that the user can carry out a test himself according to instructions. These publications refer to test methods which are carried out without aids and test methods which are carried out with aids. According to this invention the scanner sensor can be mounted in a manual device. By means of this manual device and a special software the electric conductivity can be tested.

The software is modified such that the scanner is activated by optical sensors when the bank note passes and then the pass length is measured. The electric conductivity of the ink print must be available in a defined value. By means of optical sensors the end of the bank note is determined and the scanner sensor is deactivated. Hence, the position of the electrically conductive test zone on the test object can be determined. By means of the controller the data are compared and evaluated with the stored data.

Group B

Group B has machines for the handling of bank notes. These machines are equipped with special sensors in order to detect different features. At the moment, these machines are equipped with sensors for the optical range and/or the detection of magnetic properties and/or the testing by means of a capacitive sensor for the measuring of the pass length. By these capacitive sensors the presence of electrically conductive features larger than 6 mm can be detected. They don't allow a detection of several electrically conductive test zones in pass length. Besides, the detection of a different electric conductivity in the test zones is impossible. Structures within a test zone cannot be detected as well. By means of the specified scanner sensor these tests are possible so that this group B can carry out a higher-quality test. By means of special functional printing images and the device according to this invention for testing with a modified software the machines can carry out this test.

The software for group B is designed such that the scanner sensor is activated by means of optical sensors and afterwards the ring-shaped safety element 37 and the strip-shaped safety element 38 are read. The value of the conductivity is fixed.

Deviations ±30% are rejected.

The scanner sensor is deactivated and evaluated by optical sensors.

Group C

The software is designed such that all test features are detected. By means of optical sensors the scanner sensor is activated. The pass length and pass width of the structured safety feature 36, the ring-shaped safety element 37, the strip-shaped safety feature 38, the rectangular safety element 39 as well as the rectangular safety feature 40 are detected as a non-conductive safety element. The electric conductivity is given and deviations larger or smaller than 30% are rejected.

In combination with other physical features the combined test increases the safety standard.

The specification of group C explained above shall be explained in detail as follows:

Group C has a full software or hardware version , respectively, which has the highest quality and all given structures and dimensions of the test field can be detected.

As an additional coordination the rectangular test element 39 is designed as a feature print of different physical variables.

It is one possibility to design the rectangular test element 39 as a high-quality fluorescent feature. This means that this test element is activated by a light source and the time of persistence (remiscence) is determined after the light source went out. An optical sensor-activates the test-sensing system when the bank note passes. The test sensing system consists of an optical sensor and a scanner sensor for the detection of electrically conductive test fields. The optical sensor consists of a light source and a receiver. The test object is irradiated in a defined time. After this the time of persistence of the feature inks is measured at the receiver. This time of persistence is a coding. In case of a present optical feature the capacitive scanner sensor is activated. A single test is also possible.

There is another possibility to design the rectangular test element 39 as a fluorescent feature with different ink emissions. That means that the feature print is irradiated by a light frequency a and tint a+ is emitted. For the light source with frequency b tint b+ develops. An optical sensor activates the test sensing system which consists of an optical sensor and the capacitive scanner sensor. The optical sensor consists of two light sources with different frequencies. By means of special filters it can be achieved that only one receiver is required. Another possibility is to use one light source, however, two separate receivers with upstream filters. The optical sensing system activates the capacitive scanner sensor if the optical feature is present. A single test is also possible in this case.

It is a third possibility to design the rectangular test element 39 as a magnetic ink print. An optical sensor activates the test sensing system when the bank note passes which consists of a magnetic reading head and the capacitive scanner. The magnetic reading head can detect the presence or a coding. In case of a present magnetic feature the scanner sensor is activated.

It is a fourth possibility to design the rectangular test element 39 with a conductivity 50% lower than the ring-shaped safety element 37 or the strip-shaped safety element 38, respectively. For the detection a special test software is required which only this group has access to. In case the conductivity decreases further a static measuring is required for which a special single note test device is necessary.

Especially for the application in groups B and C the entire test system can be varied and especially for the testing of the Euro it can be nationally modified as regards its objects. Since the safety feature to be tested, such as in the Euro is the same in all states the test procedure as well as the test device, however, can be modified and changed at successive intervals in a different way in the various nations depending on the objects.

The application of the safety elements and test devices as specified above is used as follows: By means of the coded specific metallizations there can be an image detection. This image detection can be used for various purposes, especially sorting purposes, denomination and counterfeit detections. Another advantage of this test method is the condition control. The electric conductivity measuring allows to draw conclusions to the condition of the bank note paper. Highly worn paper minimizes the electric conductivity very much.

In this invention at hand the structure of safety elements and a device for the test of said elements was specified by means of precise design examples. However, one should note that this invention is not limited to the details of the specification in the design examples since modifications and changes are claimed within the framework of the patent claims. The specific combination of diffraction-optically effective safety elements with other electrically conductive features results in another coding. At the same time additional electrically conductive test features such as an electrically conductive safety thread can be classified by means of the test device according to this invention.

We claim:

1. A method of testing a document for at least one of the properties thereof, the document being provided with an electrically conductive security element, an optically variable device and a metallic security strip, comprising the steps of:

capacitively coupling electrical energy from a transmitter to a receiver through the electrically conductive element to derive a first signal representative of the conductivity of the element;

deriving an optical signal from the optically variable device;

comparing the optical signal with a reference signal to derive a second signal;

the first and second signals establishing a main code as a function of their mathematical relationship;

subjecting the metallic security strip to an authenticity test to derive a third signal;

deriving from the main code and the third signal a fourth signal representative of the at least one property of the document.

2. The method of claim 1, wherein the electrical energy is coupled to different planes of the electrically conductive material.

3. The method of claim 1, wherein the transmitter comprises at least two electrodes and wherein the width of the electrically conductive material is at least equal to the width of two electrodes.

4. The method of claim 1, wherein the width of the electrically conductive material is at least equal to the adjacent transmitter and receiver.

5. The method of claim 1, wherein the electrically conductive material comprises at least two structures of different electrical conductivity and wherein the first signal is derived from separately establishing the electrical conductivity of the two structures.

6. The method of claim 1, wherein the property tested is the value of the document.

7. The method of claim 1, wherein the property tested is the authenticity of the document.

8. The method of claim 1, wherein the property tested is the degree of wear of the document.

* * * * *

UNITED STATES PATENT AND TRADEMARK OFFICE

CERTIFICATE OF CORRECTION

PATENT NO. : 7,116,406 B1
APPLICATION NO. : 09/423275
DATED : October 3, 2006
INVENTOR(S) : Puttkammer It is certified that error appears in the above-identified patent and that said Letters Patent is hereby corrected as shown below:

In column 12 line 12 reading: “material,” should read:

-- security element --

In column 12 line 15 reading: “material,” should read:

-- security element --

In column 12 line 18 reading: “material,” should read:

-- security element --

In column 12 line 21 reading: “material,” should read:

-- security element --

Signed and Sealed this

Twelfth Day of December, 2006

JON W. DUDAS
*Director of the United States Patent and Trademark Office*